(12) United States Patent
Wysocki et al.

(10) Patent No.: US 12,063,455 B2
(45) Date of Patent: Aug. 13, 2024

(54) INTERPOLATION BASED CAMERA MOTION FOR TRANSITIONING BETWEEN BEST OVERVIEW FRAMES IN LIVE VIDEO

(71) Applicant: HUDDLY AS, Oslo (NO)

(72) Inventors: Kacper Wysocki, Oslo (NO); Mats Gabriel Love Johansen, Oslo (NO); Kai Alexander Wig, Oslo (NO); Mona Kleven Lauritzen, Oslo (NO)

(73) Assignee: Huddly AS, Oslo (NO)

( * ) Notice: Subject to any disclaimer, the term of this patent is extended or adjusted under 35 U.S.C. 154(b) by 126 days.

(21) Appl. No.: 17/602,121

(22) PCT Filed: Apr. 7, 2020

(86) PCT No.: PCT/EP2020/059928
§ 371 (c)(1),
(2) Date: Oct. 7, 2021

(87) PCT Pub. No.: WO2020/208038
PCT Pub. Date: Oct. 15, 2020

(65) Prior Publication Data
US 2022/0086355 A1  Mar. 17, 2022

(30) Foreign Application Priority Data
Apr. 8, 2019  (NO) .................................. 20190477

(51) Int. Cl.
*H04N 7/14* (2006.01)
*G06F 18/214* (2023.01)
(Continued)

(52) U.S. Cl.
CPC ........... *H04N 7/147* (2013.01); *G06F 18/214* (2023.01); *G06V 10/764* (2022.01); *G06V 10/82* (2022.01);
(Continued)

(58) Field of Classification Search
CPC ........ H04N 7/15; H04N 5/2628; H04N 7/147; H04N 23/58
See application file for complete search history.

(56) References Cited

U.S. PATENT DOCUMENTS 6,297,846 B1  10/2001  Edanami
2006/0215014 A1*  9/2006  Cohen .................. H04N 19/172
375/E7.181
(Continued)

FOREIGN PATENT DOCUMENTS

EP   3287947 A1 *  2/2018  ......... G06K 9/00255
EP   3287947 A1     2/2018

OTHER PUBLICATIONS

Buckley C. Bézier curves for camera motion. Trinity College Dublin, Department of Computer Science; 1994. (Year: 1994).*
(Continued)

*Primary Examiner* — Clifford Hilaire
(74) *Attorney, Agent, or Firm* — FINNEGAN, HENDERSON, FARABOW, GARRETT & DUNNER LLP

(57) ABSTRACT

The present invention is a method and a processing device that allows smoothing of all camera parameters that are changeable while the camera is running through a tasklist component that schedules transitions synchronized with the output video frame rate. A device-native thread runs the scheduler which picks smoothing tasks off a list to meet real-time requirements. Different strategies for smoothing based on Bézier curves, splines and linear interpolation are scheduled on the runtime. The camera, which is automatically able to detect people and frame them based on where they are, uses this module to smoothly change the frame when people move in the camera field of view, among other functions.

15 Claims, 5 Drawing Sheets

(51) Int. Cl.
  G06V 10/764    (2022.01)
  G06V 10/82     (2022.01)
  G06V 20/40     (2022.01)
  G06V 20/52     (2022.01)
  G06V 40/20     (2022.01)
  H04L 65/403    (2022.01)
  H04N 5/262     (2006.01)
  H04N 7/15      (2006.01)
  H04N 7/18      (2006.01)
  H04N 23/61     (2023.01)
  H04N 23/69     (2023.01)
  H04N 23/695    (2023.01)

(52) U.S. Cl.
  CPC .............. *G06V 20/49* (2022.01); *G06V 20/53* (2022.01); *G06V 40/20* (2022.01); *H04N 5/2628* (2013.01); *H04N 7/15* (2013.01); *H04N 7/183* (2013.01); *H04N 23/61* (2023.01); *H04N 23/69* (2023.01); *H04N 23/695* (2023.01); *H04L 65/403* (2013.01)

(56) References Cited

U.S. PATENT DOCUMENTS

| | | | |
|---|---|---|---|
| 2009/0015658 A1 | 1/2009 | Enstad et al. | |
| 2010/0238262 A1* | 9/2010 | Kurtz | H04N 7/142 348/14.01 |
| 2014/0049595 A1 | 2/2014 | Feng et al. | |
| 2016/0277712 A1* | 9/2016 | Michot | G06T 7/20 |
| 2018/0063482 A1* | 3/2018 | Goesnar | H04N 23/58 |
| 2018/0091727 A1 | 3/2018 | Pell et al. | |
| 2018/0098026 A1 | 4/2018 | Gadnir et al. | |
| 2018/0376108 A1 | 12/2018 | Bright-Thomas et al. | |
| 2019/0007623 A1 | 1/2019 | Wang et al. | |

OTHER PUBLICATIONS

Buckley, C. (1994). Bézier curves for camera motion. Trinity College Dublin, Department of Computer Science. (Year: 1994).*
Office Action in European Patent Office Application No. 20722224.1 dated Oct. 5, 2023 (8 pages).
International Search Report and Written Opinion of the International Search Authority in International Application No. PCT/EP2020/059928 dated Jul. 14, 2020 (12 pages).
Office Action in Norwegian Patent Office Application No. 20190477 dated Nov. 7, 2019 (7 pages).
Kaipeng Zhang et al., "Joint Face Detection and Alignment using Multi-task Cascaded Convolutional Networks"., 2016 (5 pages).
T. Yokoi et al., "Virtual Camerawork for Generating Lecture Video from High Resolution Images"., 2005, IEEE International Conference on Multimedia and Expo, pp. 751-754 (4 pages).
Degeler Andrii., "Norwegian intelligent camera company Huddly acquires AI startup Epigram"., 2018, Tech.eu, pp. 1-7 (2 pages).
"Convolutional neural network"., 2019, Wikipedia, pp. 1-25 (25 pages).
Saypadith Savath et al., "Real-Time Multiple Face Recognition using Deep Learning on Embedded GPU System"., 2018, APSIPA Annual Summit and Conference 2018, pp. 1318-1324 (7 pages).
Xinding Sun et al., "Region of interest extraction and virtual camera control based on panoramic video capturing"., 2005, IEEE Transactions on Multimedia, pp. 981-990 (10 pages).

* cited by examiner 2.1
Empty room:
zoom out for an overview 2.2
1 person in the room:
zoom in and frame with slower more subtle timing 2.3
2nd person joins:
zoom out and frame faster to fit new person in room 2.4
Both people move:
update frame at default speed 2.5
People leave the room:
zoom out for an overview 3.1
Initial framing (A) and new framing (B)

3.4
Framing after pan, tilt and zoom interpolation 3.2
Bezier curve fitting 3.3
Interpolation of intermediate frames 4.1
Before zoom 4.2
Framing guideline 4.3
Center the framing around guideline 4.4
After zoom

INTERPOLATION BASED CAMERA MOTION FOR TRANSITIONING BETWEEN BEST OVERVIEW FRAMES IN LIVE VIDEO

TECHNICAL FIELD

The present disclosure relates in general to video transmission. In particular, a wide-angle lens allowing it to see a large space using specialized hardware and software detecting where people are, and based on this information, what part of the image to output as video.

BACKGROUND

Real-time video communications systems and the emerging field of video conferencing are facing an intrinsic challenge as they seek to simulate the experience of being present in another physical space to remote users. This is because the human eye remains vastly superior over its field of view with its ability to fixate its high-resolution fovea on objects of interest, compared to commercially available single-lens cameras with their current state-of-art resolution. In addition, video conferencing systems are limited in practice by the network bandwidth available to most users. It is not surprising, therefore, that video conferencing has seen limited uptake outside of single person-to-person video chat using the narrow field of view cameras found in most tablets, phones, and laptops.

Automated and manual pan-tilt-zoom (PTZ) cameras in commercial video conferencing systems has attempted to overcome the limitation of single lens camera resolution by optically and mechanically fixating the field of view on select parts of interest in a scene. This partially alleviates the resolution limitations, but has several drawbacks. For example, only one mechanical fixation is possible at a given time; as a result, multiple remote users with different interests may not be satisfactorily served. In addition, the zoom lens and mechanical pan-tilt mechanism drives up the cost of the camera system and posts new challenges on the reliability of the entire system. That is, an automated PTZ system creates higher demands on the mechanics compared to a manual system which typically sustains fewer move cycles through its lifetime. Compared to a stationary camera, the bandwidth-demand for high-quality video encoding also increases significantly. Similarly, some digital PTZ in existing systems present many drawbacks as discussed above, including for example the inability to be controlled by multiple users on the far end and the higher bitrate requirement for video encoding.

Prior art includes various video conferencing products that do selection of best overview frame based on beam-forming microphone triangulation or face detection and then simply switching to that framing. This approach causes a frame cut and has the double disadvantage of being a distraction to the viewer due to the discontinuous motion, and a problem for video codecs in use for conference calls, most of which rely on similarity between frames to reduce bandwidth and create a smooth, artifact-free video playback on the far end. Prior solutions also include cameras that use motors to alter the cameras pan tilt and zoom whereas this solution uses no motors and does everything using software.

In some implementations the people detection and framing are done off-device, either on host-based software or in the cloud, eventually leading to a re-framing command being passed to the camera device. That approach effectively limits the ability to animate and smooth the transition due to the bandwidth, latency and reliability of the host-device command channel.

EP3287947A1 teaches systems and methods for automatically framing participants in a video conference using a single camera of a video conferencing system. A method includes transitioning from a first scene having a first set of video settings, to a second scene in a primary video stream, with the detection of a change of people or positions of people within the overview video stream requiring a different framing according to the detected change. However, as interpolating video frames with intermediate video settings is not taught, sudden pan/tilt/zoom changes may appear.

Thus, there is a need for a solution avoiding sudden pan/tilt/zoom changes when altering the framing of people in a video stream, as this can disturb the experience of having a video call, using software to smoothly transition any adjustments to the framing of people across parameters that include pan, tilt and zoom. The resulting frame should be a closeup of all participants that can be captured by a wide-angle fixed-lens camera, using smooth changes of video stream parameters in real-time video on an embedded camera device.

Interpolation techniques for smoothing transitions between numeric values need therefore be applied to a number of camera settings to achieve smooth transitions.

SUMMARY

In view of the above, an object of the present disclosure is to overcome or at least mitigate drawbacks of prior art video conferencing systems. In particular, the present application discloses a method of transitioning from a first scene having a first set of video settings, to a second scene in a primary video stream, where the primary video stream represents a sub-video image framing detected people within an overview video image represented by an overview video stream captured by a high-resolution video camera comprising a wide angle image sensor and a video processing device, including the steps of detecting people and positions of people within the overview video image by means of machine learning supported by a convolutional neural network, when detecting a change of people or positions of people within the overview video stream requiring a different framing according to the detected change, then calculating a second set of settings for the second scene adjusting the framing according to the change of people or positions of people within the overview video stream, selecting, based on the first set of settings and the second set of settings, one of a set of predefined transition schemes to use in the transitioning and interpolating video frames with intermediate video settings in the primary video stream from the first scene to the second scene according to the selected transition scheme, wherein the set of predefined transitioning schemes are different parametric equations controlling the intermediate video settings as function of time. A processing device, adjusted to execute a corresponding method, is also disclosed.

These further aspects provide the same effects and advantages as for the first aspect summarized above.

DETAILED DESCRIPTION

According to embodiments of the present invention as disclosed herein, the above-mentioned disadvantages of solutions according to prior art are eliminated or at least mitigated.

In various embodiments according to the present invention, a video camera with a field of view lens wide enough to capture the entire space of e.g. a conference room is equipped with machine learning technology that enables the camera to understand where within the field of view of the camera there are people, and utilize an algorithm adapted to the purpose with a flexible image pipeline to transition the video caption to include in the video where people are detected in an efficient way. The output of the algorithm will instruct the image pipeline to make a transition from the current view of the primary stream to the new desired view of the primary stream.

The camera may typically have a field of view of approximately 150 degrees field of view in smaller conference rooms and approximately 90 degrees field of view in larger conference rooms. The camera includes an optical lens with appropriate field of view and a large resolution image sensor allowing the camera to zoom in on the video without losing perceived resolution.

Figure 1:
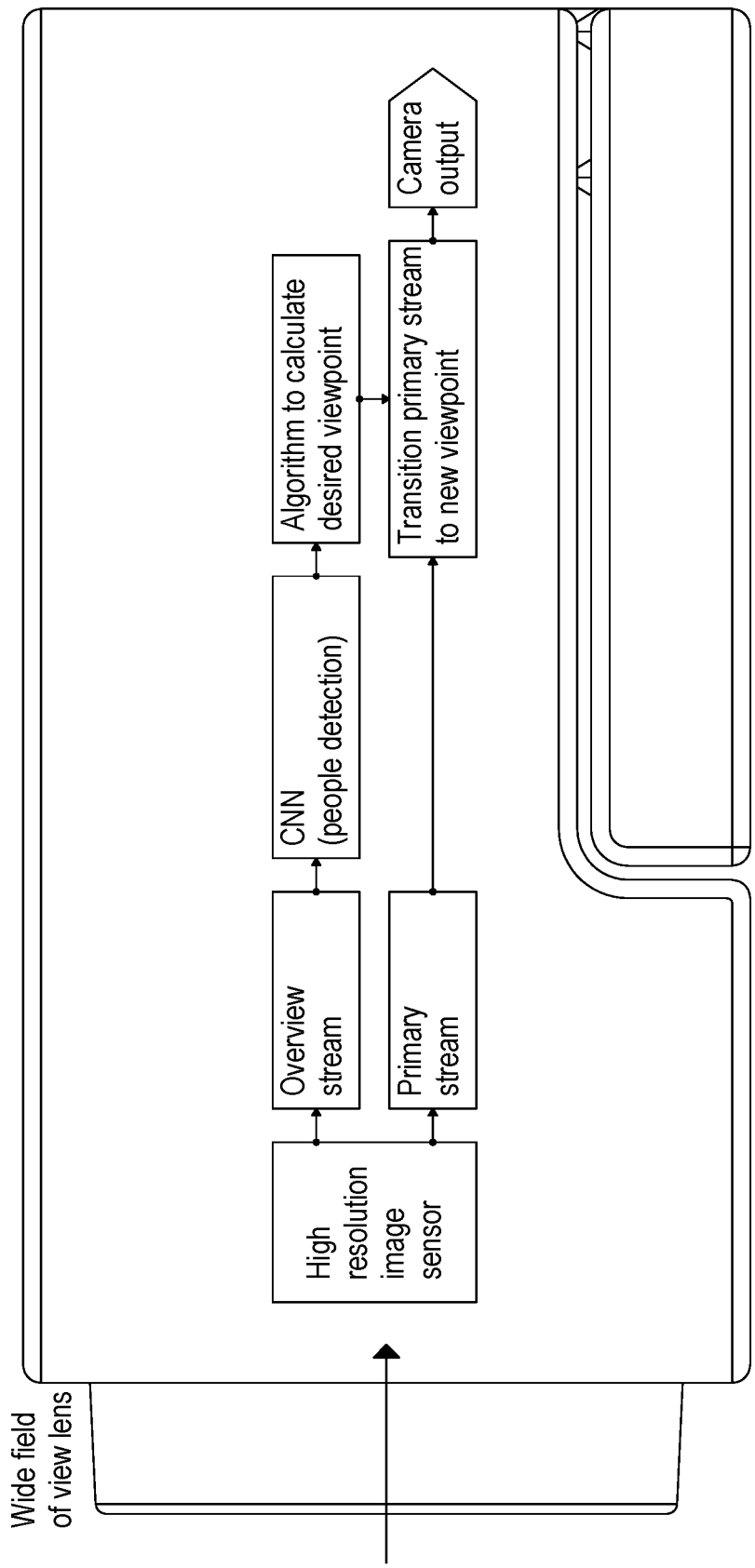
FIG. 1 shows an overview the of components according to one embodiment of the present patent application.

As illustrated in FIG. 1, a video processing unit that allows the camera to process the video data from the sensor including the ability to split the video data into two streams, one stream that is always zoomed out (hereby referred to as the "overview stream" and a second stream that provides the enhanced and zoomed video stream that is used as the primary video stream in a video conference call (hereby referred to as the "primary stream"). Using specialized hardware and software our camera detects where people are through its wide angle lens and high resolution sensor and based on this information, what part of the image to output as video.

The camera also includes a hardware accelerated programmable convolutional neural network (hereby referred to as a CNN). The CNN operates on a model designed using machine learning that allows the hardware to detect people in view of the camera using the overview stream. The CNN looks at the overview stream and detects where in the view of the camera people are detected. The advantage of using CNN and machine learning to detect people in the overview stream is that the model running on CNN can be trained to not be biased on parameters like gender, age and race. The CNN model will also be able to understand to detect a partial view of a person and people viewed from different angles (like from behind). This allows for a robust experience. The CNN hardware is able to run these detections multiple times a second allowing the camera to react to change in view of the camera in an appropriate time.

Once the number of people in view of the camera and their position has been established, the camera uses this information to run an algorithm designed to determine the appropriate and desired view to apply on the primary stream. The algorithm includes parameters that describe padding on all sides of the detected persons in view of the camera. It also includes parameters that describe how often the camera should react to change.

Figure 2:
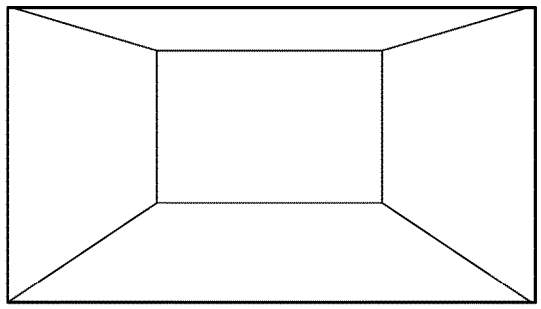
FIG. 2 shows an example of framing and reframing people
Figure 2:
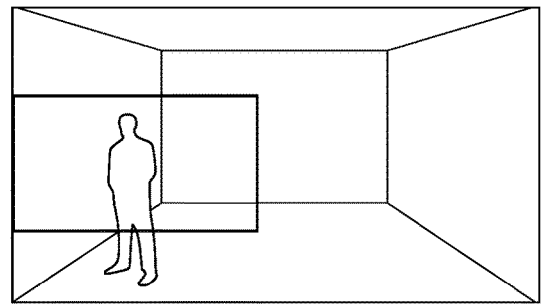
Figure 2:
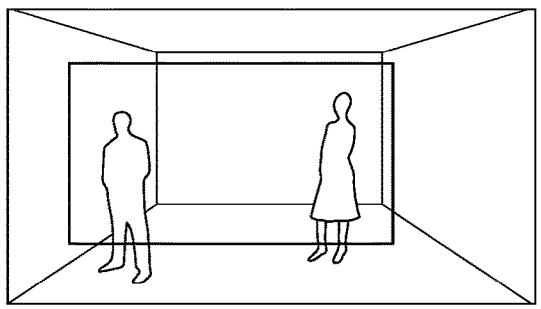
Figure 2:
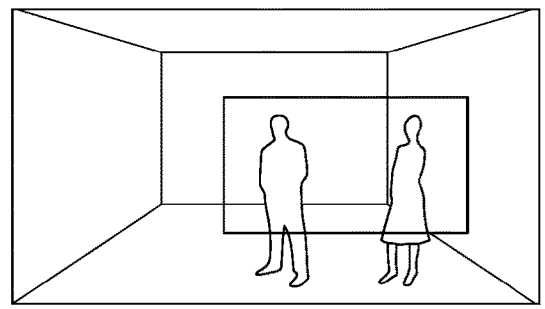
Figure 2:
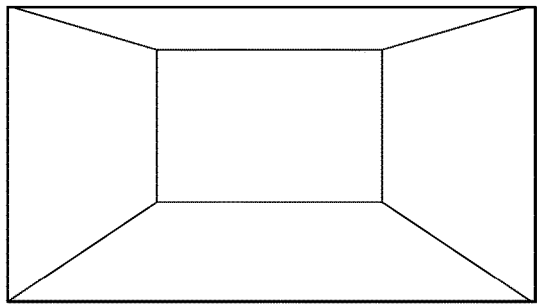

The visual result of this is illustrated in FIG. 2. By detecting where people are, the camera adapts the field of view for the best experience, at varied speed based on what is happening. For instance, if there are new people (FIG. 2.1) then the camera is zoomed out, if there is one person (FIG. 2.2) the camera frames that person, if there are two (FIG. 2.3) then the camera frames both people and if the people move (FIG. 2.4) the camera may update the framing as well.

The output of the algorithm will instruct the image pipeline to make a transition from the current view of the primary stream to the new desired view of the primary stream. This transition is a high frame rate transition that follows a curve that provides a desired fluid experience between the previous view to the new desired view.

The result of this combination of a wide angle lens, programmable image pipeline and a hardware accelerated convolutional neural network is an experience where the camera adapts to people entering and leaving the conference room and people moving about in the conference room in a natural fluid way without having to have any moving parts on the camera.

In some embodiments, the above mentioned transition allows smoothing of all camera parameters that are changeable. The camera may run through a tasklist component that schedules transitions synchronized with the output video frame rate. The tasklist and the scheduler provide the possibility of running a plurality of simultaneous processes in a time interval. A device-native thread runs the scheduler which picks smoothing tasks off a list to meet real-time requirements. Different strategies for smoothing based on Bezier curves, splines and linear interpolation are scheduled on the runtime. The camera, which is automatically able to detect people and frame them based on where they are, uses this module to smoothly change the frame when people move in the camera field of view, among other functions.

In further embodiments of the present invention, all settings, such as for instance pan, tilt and zoom, are defined and stored as distinct numbers on the camera device. A scheme for transitioning from one set of settings to another runs in lockstep with the output video frame rate. This scheme needs to be lightweight enough to run in the little CPU runtime left over between processing two frames at a nominal 30 frames per second on the camera device, as well as be flexible enough to support settings consisting of single numbers, vectors as well as matrices of numbers, ideally being able to transition many different settings of different dimensions, magnitudes and durations at the same time.

In some embodiments to implement such a scheme, transitions are broken into steps and a scheduler is devised which can execute the transition one step at a time. When the transition step is executed, the scheme must figure out where relative to the target of the transition this step resides, select the appropriate smoothing function, compute the appropriate interpolation parameters and then activate the client-defined function that updates the camera setting to be smoothed.

The length of the transition time from one frame to another frame can vary, based on whether the camera is zooming in or out, and depending on how big the difference in zoom is. This has been done to create a more natural meeting experience. Examples of variations may include:

1. When people are outside the current camera frame of view and a transition is to be made that involves zooming out, the time of the transition should be short so that users get a quick response.

2. When small adjustments to the framing are to be made, the transitions should take longer time. This may be done so that so not to disturb the meeting experience with abrupt, small changes.
3. When large adjustments to the framing are to be made when zooming in, the camera transitions take even longer, again to not make the experience abrupt.

Furthermore, the interpolation technique between frames may be supported by a parametric equation as a function of time, controlling parameters like pan, tilt, zoom, but also other image parameters like white balance and colors for the interpolated frames in a transition to define an eased transition between frames. Rather than moving from one frame to another at a fixed number of pixels per time frame, we can specify a custom setting of acceleration, allowing us to ease-in and out of the change to a new frame to make the experience feel more natural. The parametric equation should be selected based on the identified transition situation (for example one of the three situations disclosed above) resulting in the most natural meeting experience.

In some embodiments, the parametric equations are Bézier-curves. A Bézier-curve is a parametric curve used in computer graphics and related fields and is commonly used to model smooth curves that can be scaled indefinitely. For example, in the domain of animation and user interface design, Bezier curves are used because they offer a satisfactory easing, are relatively simple to implement and provide four well-documented key parameters that can be understood and tuned without having to delve into implementation details.

In some embodiments, Bézier curves are used in a relatively straightforward implementation of iteratively evaluating the cubic Bézier function from a starting point to a target point, with four control points. It allows the points to either be single dimensional values, n-dimensional vectors or arbitrary matrices which are interpolated piecemeal by evaluating each numerical value with the same function and parameters. One detail to note is that transitioning adds another dimension to camera settings; so that even single-valued points become transitional curves along the time axis, any n-dimensional vector gets extended to n+1 dimensions as one may consider time as another dimension.

The smoothing should provide as simple and yet as flexible an interface as possible, and opt for a simple interface of only one method. This method allows the software component in the processor, e.g. located in the camera, to add itself to the transition task list. To do so, the software component must provide the start and target values to be transitioned between, a transition time specifying how long or slow the smoothing should be, or alternatively at what average or maximum speed the transition should have, the setter function that takes intermediate transitional values and updates the given camera setting at every step of the transition, an optional object context for the setter function in case it needs to store or refer to something across steps, and an optional callback function which is called when the transition has reached its end. This callback can be used for instance in queuing another transition, or to notify another part of the system that resources have been freed up.

The software component can optionally also set the Bézier curve parameters for this transition, though we provide default parameter values if these are not shipped by the software component. This can be used for instance to create faster acceleration and slower deceleration for reframings which have higher confidence.

When one or more transitions are on the tasklist, the scheduler runs on every frame and iterates over this task list, updating each task with the current time. Time is used to calculate precisely where each step in the transition needs to be. Alternatively, a step fraction or the number of frames that a transition duration spans could be used, however that approach has the disadvantage that if the video stream experiences frame drops or jitter, this may cause the transition motion to stutter or otherwise seem discontinuous, while if the time till end of transition is calculated any frame lag or drops will be automatically compensated for by updating the motion for the current step to be further along the Bézier curve.

The current time is also used to check if the end of the transition has been reached or surpassed, in which case the camera setting is updated to the target value and this transition task is deleted from the task list, freeing up valuable resources to be used in future transitions.

Tasks can also be updated in real time, for instance when we are in the middle of moving the pan and tilt toward a detected face when a new detection shows that the frame should span two people at opposite sides of the room, if the frame is tracking one person whom is continuously moving in front of a stationary camera, or the camera is moving with respect to its subject. In the case of updating transition tasks we can forego the deceleration phase of the old Bézier curve and the acceleration phase of the new curve to achieve a smoother user experience. We can also compute the current speed of the transition and match that in the initial conditions of the new curve, all transparent with respect to the software component which is still only concerned with adding itself to the transition task list regardless of whether it already exists there.

Figure 3:
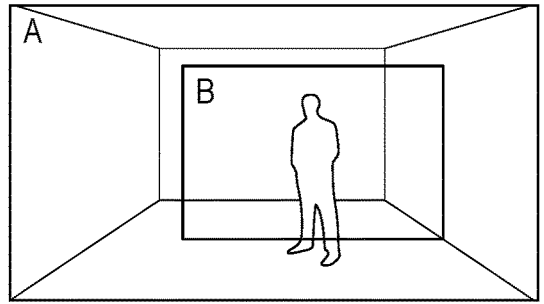
FIG. 3 shows an example of how the frames are interpolated according to one embodiment of the application.
Figure 3:
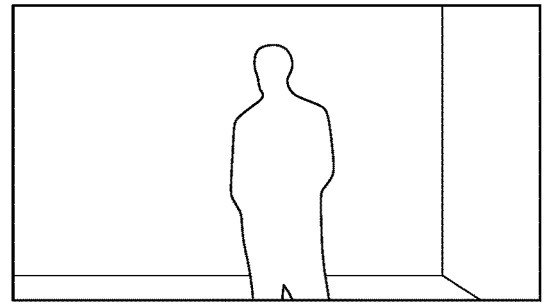
Figure 3:
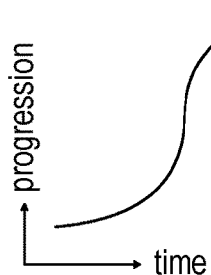
Figure 3:
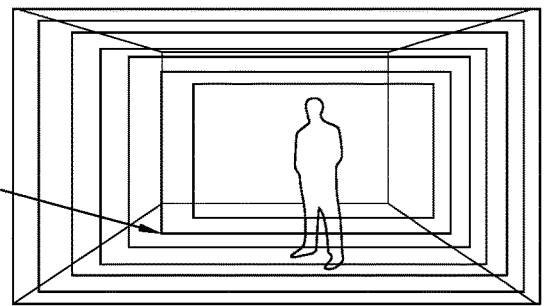

FIG. 3 is an illustration of an example of transition according to one embodiment of the present application. After detecting a new situation of people from the overview stream, a new framing (B) is determined. The transition should therefore be carried out between the initial framing (A) and the new framing (B). A Bézier curve with certain parameters is selected based on the identified transition situation (for example one of the three situations disclosed above) resulting in the most natural meeting experience. The transition is carried out accordingly, with interpolation of frames between the initial framing (A) and the new framing (B) according to this selection. As indicated in 3.2 and 3.3 each interpolated frame corresponds to a point on the selected Bézier curve, determining at least pan, zoom and tilt of that frame. Rather than moving from one frame to another at a fixed number of pixels per time frame, one can then specify a custom setting of e.g. acceleration, allowing us to ease-in and out of the change to a new frame to make the experience feel more natural.

Figure 4:
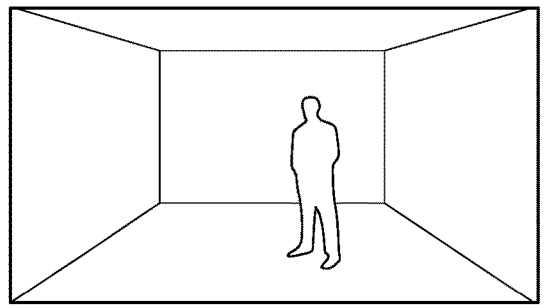
FIG. 4 is an example of zooming in according to one embodiment of the application
Figure 4:
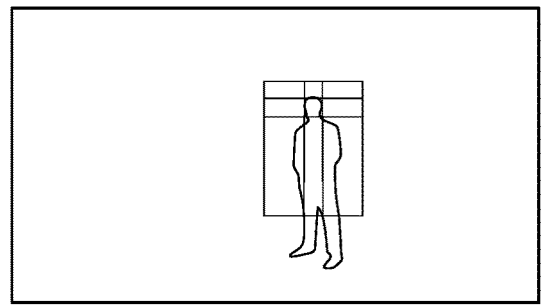
Figure 4:
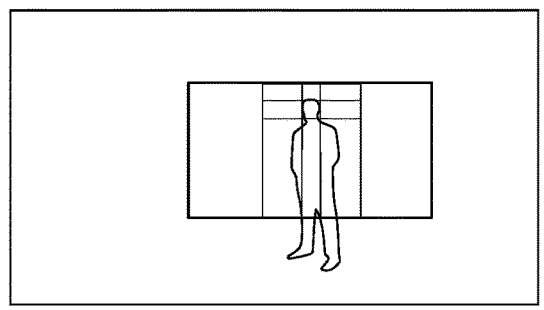
Figure 4:
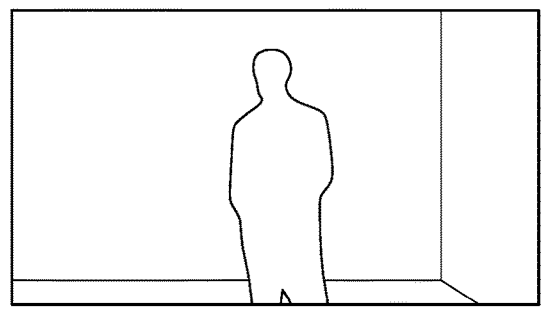
Figure 5:
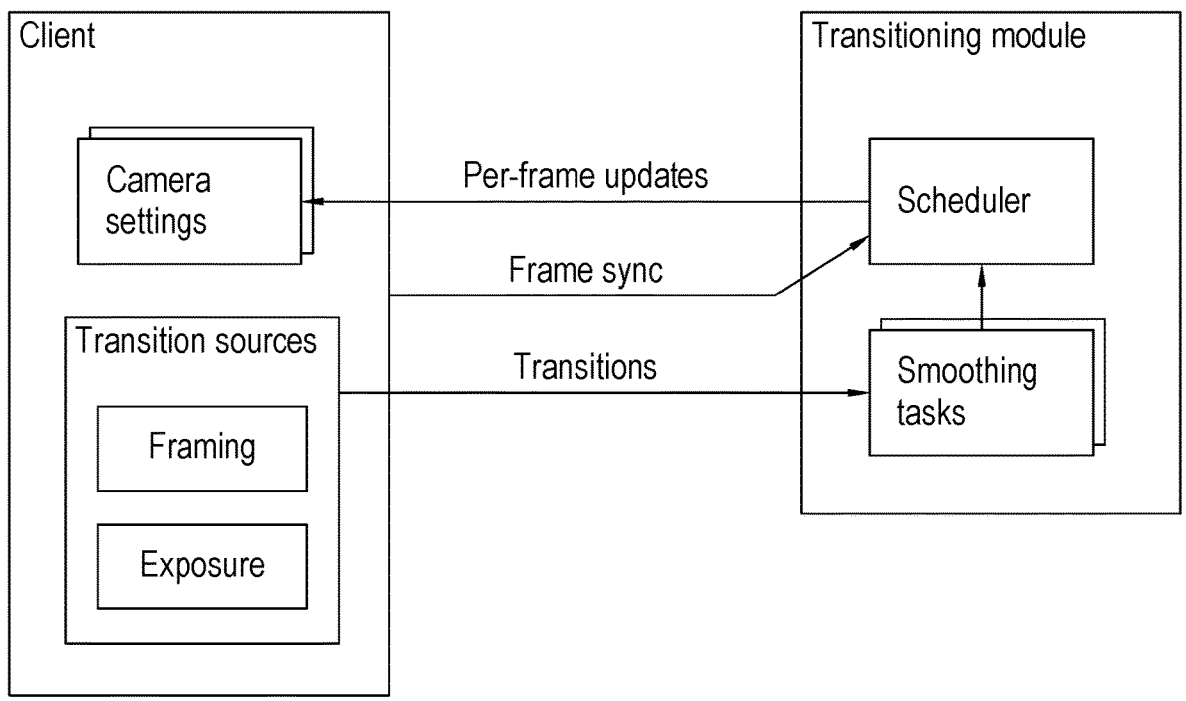
FIG. 5 is a system overview according to one embodiment of the patent application.

FIG. 4 is an example of zooming in according to some embodiments of the application. The output of the algorithm will instruct the image pipeline to make a transition from the current view of the primary stream to the new desired view of the primary stream.

As used herein, the terms "first", "second", "third" etc. may have been used merely to distinguish features, apparatuses, elements, units, or the like from one another unless otherwise evident from the context.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A video conferencing camera adapted to provide a smoothing transition in a video stream from a first scene with a first set of video settings to a second scene with a second set of video settings by interpolating video frames with intermediate video settings, wherein the smoothing transition is based on a predefined transition scheme between the first set of video settings and the second set of video settings, wherein the predefined transition scheme is a parametric equation, and
    wherein the video conferencing camera further comprises a processing unit adapted to split the video stream into an overview stream and an enhanced primary stream, wherein the enhanced primary stream represents a sub-video image framing detected people within an overview video image represented by the overview stream, wherein the first scene represents a current view with the first set of video settings in the enhanced primary stream and the second scene represents a desired view with the second set of video settings in the enhanced primary stream, and wherein the first and second sets of video settings include pan, tilt and zoom of the sub-video image within the overview video image.

2. The video conferencing camera of claim 1, wherein the parametric equation represents Bézier curves.

3. The video conferencing camera of claim 1, wherein the smoothing transition is further based on splines.

4. The video conferencing camera of claim 1, wherein the smoothing transition is further based on linear interpolation.

5. The video conferencing camera of claim 1, wherein the predefined transition scheme is selected from a group consisting of:
    (i) the second set of video settings representing a second scene zoomed out relative to the first scene having the first set of settings, and the parametric equation representing a first predefined time of transition;
    (ii) the second set of video settings representing a second scene with small adjustments relative to the first scene having the first set of settings, and the parametric equation representing a second predefined time of transition; and
    (iii) the second set of video settings representing a second scene with large adjustments and zoomed in relative to the first scene having the first set of settings, and the parametric equation representing a third predefined time of transition,
    wherein the third predefined time of transition is longer than the second predefined time of transition, and the second predefined time of transition is longer than the first predefined time of transition.

6. The video conferencing camera of claim 1, further comprising a programmable convolutional neural network adjusted to detect people and positions of people within the overview video image by means of machine learning.

7. A method for providing a smoothing transition in a video stream from a first scene with a first set of video settings to a second scene with a second set of video settings, comprising
    defining a transition scheme between the first set of video settings and the second set of video settings by splitting the video stream into an overview stream and an enhanced primary stream, wherein the enhanced primary stream represents a sub-video image framing detected people within an overview video image represented by the overview stream, wherein the first scene represents a current view with the first set of video settings in the enhanced primary stream and the second scene represents a desired view with the second set of video settings in the enhanced primary stream, and wherein the first and second sets of video settings include pan, tilt and zoom of the sub-video image within the overview video image; and
    interpolating video frames with intermediate video settings, wherein the transition scheme is a parametric equation.

8. The method of claim 7, wherein the parametric equation represents Bézier curves.

9. The method of claim 7, wherein the smoothing transition is further based on splines.

10. The method of claim 7, wherein the smoothing transition is further based on linear interpolation.

11. The method of claim 7, wherein the predefined transition scheme is selected from a group consisting of:
    (i) the second set of video settings representing a second scene zoomed out relative to the first scene having the first set of settings, and the parametric equation representing a first predefined time of transition;
    (ii) the second set of video settings representing a second scene with small adjustments relative to the first scene having the first set of settings, and the parametric equation representing a second predefined time of transition; and
    (iii) the second set of video settings representing a second scene with large adjustments and zoomed in relative to the first scene having the first set of settings, and the parametric equation representing a third predefined time of transition,
    wherein the third predefined time of transition is longer than the second predefined time of transition, and the second predefined time of transition is longer than the first predefined time of transition.

12. The video conferencing camera of claim 1, wherein the video conferencing camera comprises at least one image sensor.

13. The method of claim 7, further comprising detecting, by an adjusted programmable convolutional neural network, people and positions of people within the overview video image by means of machine learning.

14. The video conferencing camera of claim 1, wherein the video conferencing camera comprises a wide angle image sensor.

15. The method of claim 7, wherein the smoothing transition is further based on real-time requirements.

* * * * *